United States Patent [19]

McElroy et al.

[11] Patent Number: 5,348,691
[45] Date of Patent: Sep. 20, 1994

[54] ATMOSPHERE MEMBRANE HUMIDIFIER AND METHOD AND SYSTEM FOR PRODUCING HUMIDIFIED AIR

[75] Inventors: James F. McElroy; William F. Smith, both of Suffield; Joseph E. Genovese, East Granby, all of Conn.

[73] Assignee: United Technologies Corporation, Hartford, Conn.

[21] Appl. No.: 76,459

[22] Filed: Jun. 11, 1993

[51] Int. Cl.$^5$ .................................... B01F 3/04
[52] U.S. Cl. .................... 261/36.1; 261/70; 261/97; 261/104; 261/DIG. 46
[58] Field of Search ............... 261/36.1, DIG. 46, 104, 261/70, 97

[56] References Cited

U.S. PATENT DOCUMENTS

| | | | |
|---|---|---|---|
| 2,990,696 | 7/1961 | Fisher | 261/104 |
| 3,369,343 | 2/1968 | Robb | 261/104 |
| 3,735,559 | 5/1973 | Salemme | 261/104 |
| 3,788,545 | 1/1974 | Budd et al. | 261/104 |
| 3,918,469 | 11/1975 | Zamboni et al. | 261/DIG. 46 |
| 4,098,852 | 7/1978 | Christen et al. | 261/104 |
| 4,101,294 | 7/1978 | Kimura | 261/104 |
| 4,381,267 | 4/1983 | Jackson | 261/104 |
| 4,921,642 | 5/1990 | LaTorraca | 261/104 |

FOREIGN PATENT DOCUMENTS

| | | | |
|---|---|---|---|
| 0137007 | 10/1980 | Japan | 261/104 |
| 61-72948 | 4/1986 | Japan | 261/104 |
| 1180842 | 8/1986 | Japan | . |
| 1-0318830 | 12/1989 | Japan | 261/104 |
| 2223694 | 4/1990 | United Kingdom | 261/104 |

*Primary Examiner*—Tim Miles
*Attorney, Agent, or Firm*—Mary R. Bonzagni

[57] ABSTRACT

A membrane humidifying device is disclosed that can operate with normal potable quality water without a demineralizer and which prevents the transport of microbes, particulates, dissolved salts and liquid water to the airstream. It is positioned in the flow path of air to be humidified and comprises at least one membrane cell and a means for introducing water into each cell. The membrane cell is comprised of at least one sheet of a hydrophilic membrane and at least one screen. Ambient or low pressure water is introduced into the membrane cell(s); at least a portion of which contacts or passes through the screen(s); contacts the hydrophilic membrane(s); and is osmotically transported across the membrane(s) where it evaporates into the airstream.

15 Claims, 2 Drawing Sheets

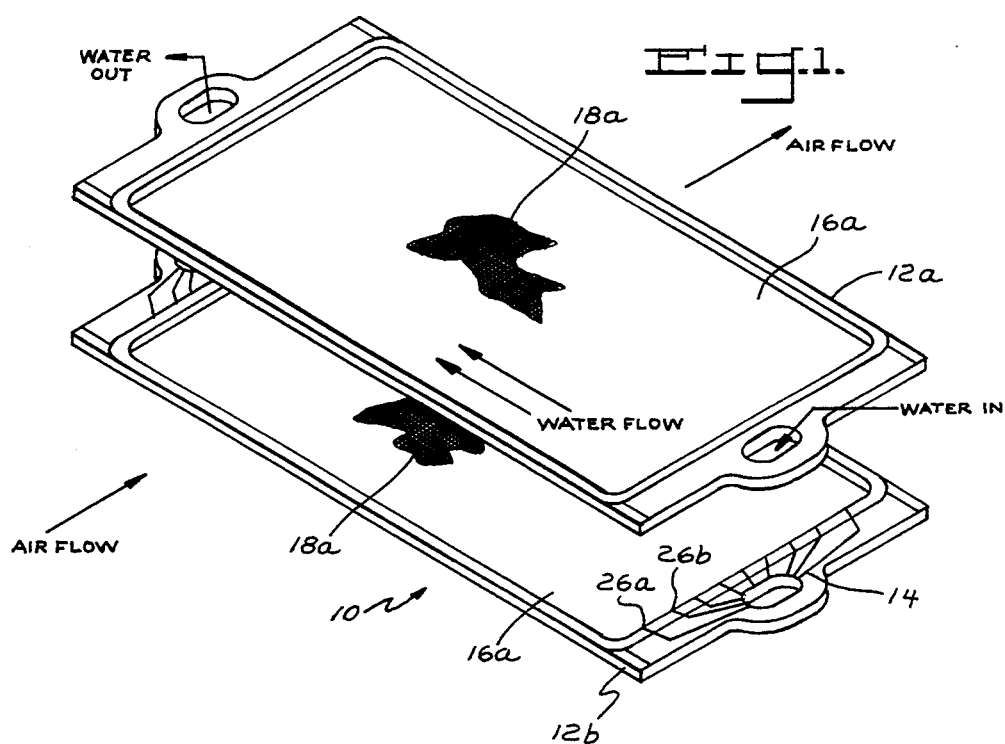
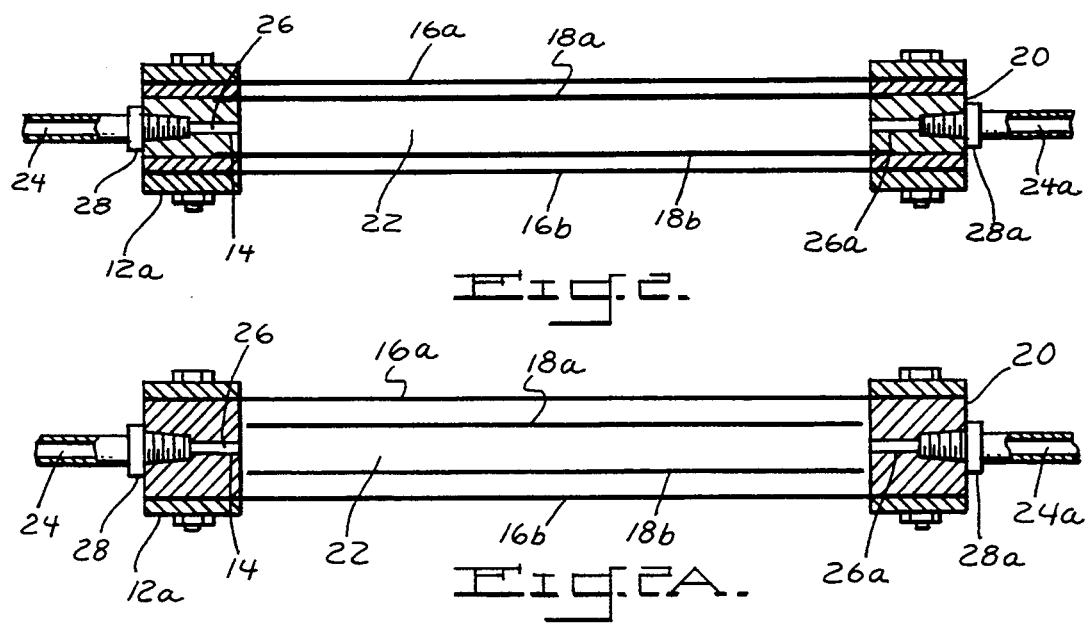

ATMOSPHERE MEMBRANE HUMIDIFIER AND METHOD AND SYSTEM FOR PRODUCING HUMIDIFIED AIR

BACKGROUND OF THE INVENTION

The present invention relates to humidifying devices that can be used in aircraft environmental systems and in commercial and home ventilation systems.

Humidifying devices for humidifying air supplied to an enclosure or the like are known. The most notable of these prior art devices are misting devices that mechanically sling fine water droplets into a dry air stream with the idea that, if the droplets are small enough, they will quickly be absorbed and thus humidify the air.

One notable application for these humidifying devices is in aircraft environmental systems that provide humidified fresh air to crew members and passengers. The source of air for these systems is the air outside the aircraft which, at high altitudes, is extremely dry. After a few hours in this dry environment, crew and passengers can become quite uncomfortable. This is especially true for crew members where high fresh-air flows are maintained to assure alertness. For these reasons, the fresh air delivered to crew members is often humidified on long flights.

The prior art humidifying devices have been found to be troublesome in several areas. The troublesome aspects of these devices create potentially adverse health and comfort conditions for persons exposed to the humidified air produced. In particular, bacteria can grow within these humidifying devices and can be readily dispelled with the humid fresh air. In addition, these devices allow liquid droplets to be delivered with the fresh air. Moreover, the potable water source for these devices usually contains minerals which eventually clog or foul equipment and, as a result, such minerals are dispelled with the air and leave deposits on exposed articles, such as electronic equipment. Accordingly, humidifying devices that correct these known deficiencies of the prior art devices have been sought.

It is therefore an object of the present invention to provide a humidifying device that prevents the transport of microbes, particulates, and dissolved salts to the airstream.

It is a further object of the present invention to provide such a device that also prevents liquid water transport to the humidified air.

It is still a further object of the present invention to provide a humidifying device that can operate with normal potable quality water without a demineralizer.

SUMMARY OF THE INVENTION

The present invention relates to a membrane humidifying device and to a system and method for producing humidified air. The membrane humidifying device comprises at least one membrane cell and a means for introducing water into each cell. The membrane cell is comprised of: at least one sheet of a hydrophilic membrane that is capable of osmotically transporting water; and at least one screen which serves to provide even water flow distribution in the membrane cell and to support the hydrophilic membrane(s).

The system for producing humidified air comprises the membrane humidifying device as set forth hereinabove; an optional housing for the humidifying device; a liquid reservoir in fluid connection with the humidifying device for the temporary storage of water; a means for the introduction of water into the liquid reservoir; and a means for regulating water pressure in fluid connection with the humidifying device and liquid reservoir. The means for regulating water pressure retains water until the water reaches a desired pressure level.

The method for producing humidified air comprises introducing ambient or low pressure water into the membrane humidifying device, which is positioned in the flow path of air to be humidified. In the membrane humidifying device, at least a portion of the water contacts or passes through the screen(s); contacts the membrane(s); is osmotically transported across the membrane(s); and evaporates into the airstream.

The foregoing and other features and advantages of the present invention will become more apparent from the following description and accompanying drawings.

BRIEF DESCRIPTION OF THE DRAWINGS

FIG. 1 is a top perspective view of a preferred inventive humidifying device, with two membrane cells with water introduction means being shown;

FIG. 2 is a fragmentary cross-sectional view of one of the membrane cells with water introduction means shown in FIG. 1;

FIG. 2A is a fragmentary cross-sectional view of one of he membrane cells with loosely contained screens therein.

DESCRIPTION OF THE PREFERRED EMBODIMENT

Figure 3:
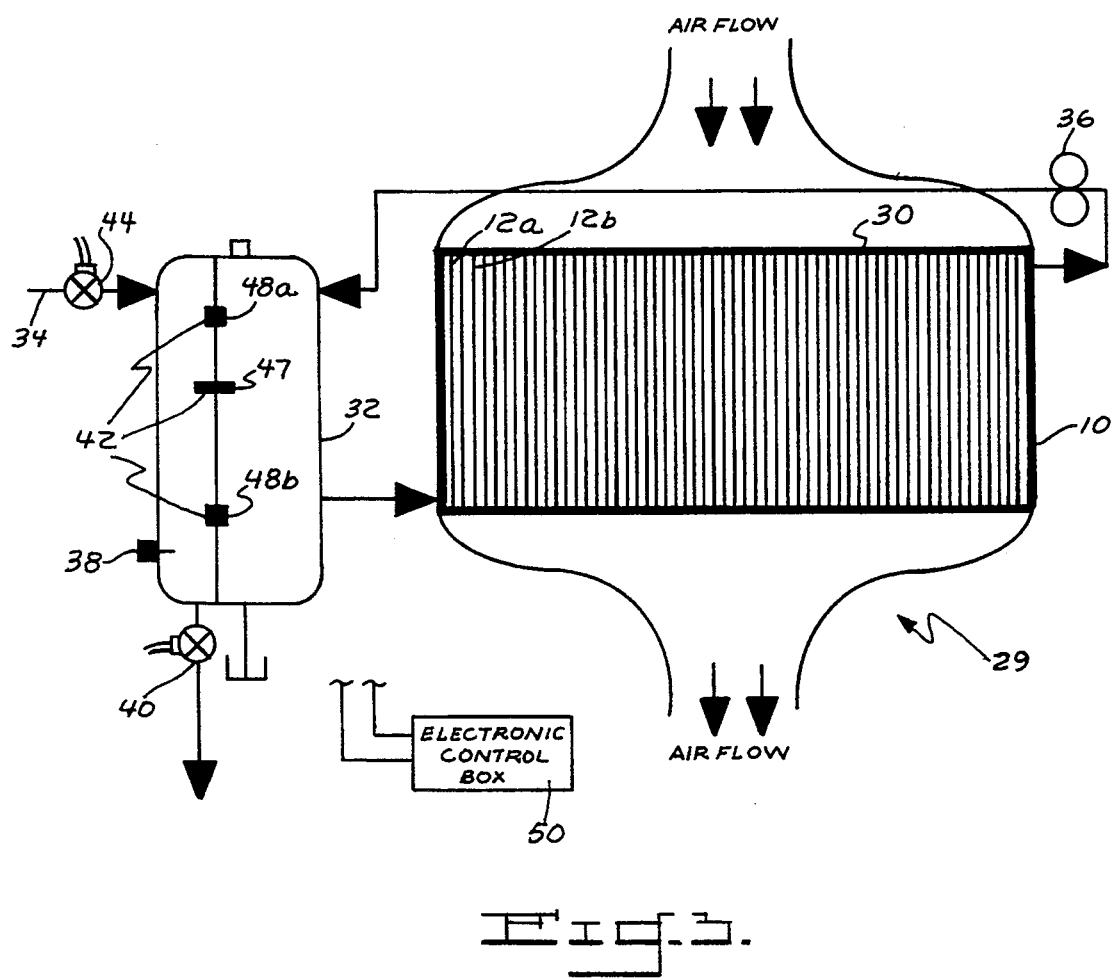
FIG. 3 is a schematic of the inventive system for producing humidified air.

Referring to the drawings in detail, the membrane humidifying device of the present invention is shown generally at 10. The humidifying device 10 is comprised of at least one membrane cell, with two identical cells 12a and 12b being illustrated in FIG. 1, and a means 14 for introducing water into each cell. The membrane cell includes at least one sheet, e.g. 16a, of a hydrophilic membrane and at least one screen, e.g., 18a.

The hydrophilic membrane, e.g., 16a, of the present invention can be any membrane capable of attracting and osmotically transporting water, but which prevents the transport of microbes, particulates and dissolved salts across the membrane. Preferred membranes include ion exchange membranes such as polystyrene sulfonic acid and perfluorocarbon sulfonic acid membranes. The most preferred hydrophilic membrane is a perfluorocarbon sulfonic acid membrane. Such membranes are produced by E.I. duPont de Nemours & Co., Inc., Wilmington, Del. and sold under the trademark NAFION ® membranes. Similar perfluorocarbon sulfonic acid membranes are produced by Dow Chemical Co. and others.

The screen (e.g., 18a ) of the present invention is a metal or plastic screen capable of providing support for the hydrophilic membrane(s) (e.g., 16a) under moderate pressure gradient conditions. The screen 18a, in addition to providing support for the membrane(s) provides even water flow distribution in the membrane cell 12a or 12b to eliminate dead zones. The thickness and mesh size of this screen is determined on the basis of mass flow rates, pressure and temperature conditions. It is preferred that this screen has a mesh size of about 2/0 to about 6/0, with mesh sizes of about 3/0 to about 5/0 being the most preferred. The screen thickness is preferably from about 0.05 millimeters (mm) to about 0.5 mm, with thicknesses of about 0.05 mm to about 0.3 mm being the most preferred. Possible metal screens are those expanded or woven metal screens that are compatible with a water environment and include silver, aluminum and stainless steel expanded metal screens, such as those produced by Newark Wire Cloth Inc., Newark, N.J. Possible plastic screens include polypropylene, PFE plastic screens, such as those produced by E.I. duPont de Nemours & Co., Inc., Wilmington, Del.

A cross section of a preferred membrane cell 12a with water introduction means 14 is set forth in FIG. 2. Two membranes 16a and 16b are clamped and two screens 18a and 18b are mounted in a frame 20. The membranes 16a and 16b have the same dimensions as the outer perimeter of the frame 20 and the screens 18a and 18b have dimensions slightly larger than the inner perimeter of the frame 20. Water is directed to channel 22, defined by the screens 18a and 18b by tube 24, which is in fluid alignment with means 14 which comprises a conduit 26 formed by frame 20. The tube 24 is secured to the frame 20 by a threaded adapter 28. Water exits the membrane cell 12a through conduit 26a and tube 24a, which is secured to frame 20 by a threaded adapter 28a. In a more preferred embodiment (not shown), a third screen, having dimensions smaller than the inner perimeter of the frame 20, is located in channel 22. This third screen is not clamped or mounted in the frame 20.

In another preferred embodiment of the inventive membrane cell 12 with water introduction means 14 (See FIG. 2A), two membranes 16a and 16b are clamped in a frame and two screens, having dimensions slightly smaller than the inner perimeter of the frame, are loosely contained within the channel defined by the membranes 16a and 16b. The presence of loosely contained screens in the water flow path aids in even water flow distribution.

In yet another embodiment of the inventive membrane cell 12 with water introduction means 14 (not shown), one membrane 16 is clamped and two screens 18a and 18b, positioned on either side of the membrane 16, are mounted in a frame 20.

The preferred means 14 for introducing water to the membrane cell (e.g., 12a) can also comprise a branched configuration of conduits (e.g., 26a, 26b) formed by frame 20 as best shown in FIG. 1.

In operation, the preferred inventive membrane cell (e.g., 12a) with water introduction means 14 as set forth in FIG. 2 is positioned in an airstream (e.g., duct work) such that air flows across the outer exposed surfaces of membranes 16a and 16b. It is preferred that the direction of the air flow across the outer surface of membranes 16a and 16b be different than the direction of the water flow across the inner surfaces of screens 18a and 18b. When water enters the membrane cell (e.g., 12a) with water introduction means 14 through tube 24 and conduit 26, it enters channel 22 where at least a portion of the incoming flow passes through screens 18a and 18b and is attracted by the hydrophilic membranes 16a and 16b. That portion of water is then osmotically transported across membranes 16a and 16b to the outer surfaces where it evaporates into the airstream. As stated above, membranes 16a and 16b prevent the transport of microbes, particulates and dissolved salts across the membranes. Due to the possibility of airborne bacteria growing on the outer air exposed surfaces of membranes 16a and 16b, it is preferred that membranes 16a and 16b be dried out on a periodic basis.

Referring to FIG. 3, the preferred system for producing humidified air is shown generally at 29. The preferred system 29 uses potable water and recycled potable water and comprises the membrane humidifying device 10; a housing for the humidifying device 30; a liquid reservoir 32 in fluid connection with the humidifying device 10, which has venting and draining capacities, for the temporary storage of water; a means 34 for the introduction of water into the liquid reservoir 32; and a means 36 in fluid connection with the humidifying device 10 and with the liquid reservoir 32 for regulating water pressure. In a more preferred embodiment, the system 29 further comprises a means 38 for monitoring the conductivity of water contained in the liquid reservoir 32; a means 40 for purging the liquid reservoir 32 and humidifying device 10 when the conductivity level of water contained in the liquid reservoir 32 reaches a certain level; a means 42 for monitoring the water level in the liquid reservoir 32; and a means 44 for stopping the water flow into the liquid reservoir 32 when the water reaches a certain high level and for allowing the flow of water when the water level drops below a certain level.

The conductivity monitoring means 38 and the purging means 40, as well as the water level monitoring means 42 and the flow control means 44, are in electronic contact via an electronic control box 50.

The preferred membrane humidifying device 10 of the preferred system 29 comprises thirty-two membrane cells with water introduction means, identical to 12a and 12b, arranged in a parallel configuration. The remaining components of the present inventive system 29 can be conventional.

The humidification rates achieved by the present inventive system 29 are dependent upon the temperature of both the water and the air to be humidified in addition to the membranes (e.g., 16a and 16b) surface area. Water introduced to the membrane cells (e.g., 12a and 12b) can be at room temperature or at slightly elevated temperatures. When water at slightly elevated temperatures is used in the inventive system 29, humidification rates are increased and the required membrane (e.g., 16a) surface area needed to achieve a certain humidification rate is decreased. Similarly, as the temperature of the air flowing over the outer surfaces of the membranes (e.g., 16a and 16b) increases, humidification rates increase and the required membrane surface area decreases.

The method for producing humidified air utilizing the above-described system 29 comprises positioning the system 29 in the flow path of the air to be humidified and introducing water to the liquid reservoir 32 through means 34. When the water level reaches a high limit in the liquid reservoir 32, flow control means 44 (e.g., a fill valve) is powered closed, via monitoring means 42, which comprises a float 47 and level switch 48a, interrupting the supply of water. Water from the liquid reservoir 32, at ambient or low pressure, is then introduced to the membrane humidifying device 10. As water enters each membrane cell through means 14, a portion of it contacts or passes through the screens (e.g., 18a and 18b), the water contacts the hydrophilic membranes (e.g., 16a and 16b), and is absorbed and osmotically transported to the outer surfaces of the membranes (e.g., 16a and 16b) where it evaporates into the airstream. Water that is not absorbed exits the membrane humidifying device 10 and is directed to a means for regulating water pressure 36, such as a positive displacement pump. Water is then directed to the liquid reservoir 32. It is preferred that the recycled water flow rate ratio in system 29 be greater than 10:1 to ensure even flow distribution and to prevent local drying.

Where water is introduced to the membrane humidifying device 10 at a pressure below the pressure of the air to be humidified, a pressure gradient across membranes 16a and 16b is created. As a result, the possibility of liquid water transport to the air stream in the event of a membrane puncture or tear is eliminated.

In operation of the more preferred embodiment of the system 29, the water level and conductivity of the water within the liquid reservoir 32 is constantly monitored. When the water level reaches a low limit, flow control means 44 (e.g., a fill valve) is powered open, via monitoring means 42 which comprises a float 47 and level switch 48b, and allows the flow of water until the water level reaches a high limit. When the conductivity of the water reaches a high limit, purging means 40 (e.g., a purge valve) opens and the system 29 is powered off, via monitoring means 38 (e.g., a conductivity sensor), emptying water from the liquid reservoir 32 and the membrane humidifying device 10. When the water level reaches a low limit, the system 29 is powered on, the purge valve 40 closes, and the fill valve 44 is powered open allowing the flow of water until the water level in the liquid reservoir 32 reaches a high limit.

As stated hereinabove, due to the possibility of airborne bacteria growing on the outer air exposed surfaces of membranes (e.g., 16a and 16b), it is preferred that the system 29 be periodically shut-down and the water supply to the membrane humidifying device 10 halted to enable the membranes (e.g., 16a and 16b) to dry out, thereby cutting off the source of nutrients to the bacteria.

While particular embodiments of this invention have been shown, it will be appreciated by those skilled in the art that various changes in form and detail thereof may be made without departing from the spirit and scope of the present invention.

Having thus described the invention, what is claimed is:

1. A membrane humidifying device that comprises at least one membrane cell and a means for introducing water into said cell wherein said membrane cell comprises:
   a. at least one sheet of a hydrophilic membrane, having a first side and a second side, capable of osmotically transporting water from said first side to said second side; and
   b. at least one screen for providing structural integrity to said hydrophilic membrane(s), wherein each screen is located adjacent to said first side of at least one membrane and wherein said screen(s) has a mesh side of about 2/0 to about 6/0 and a thickness of about 0.05 to about 0.5 millimeters;
   wherein said means for introducing water into said cell directs water to said first side(s) of said hydrophilic membrane(s).

2. The membrane humidifying device of claim 1 wherein said membrane cell comprises the following four contiguous layers:
   a. a first sheet of a hydrophilic membrane;
   b. a first screen;
   c. a second screen; and
   d. a second sheet of a hydrophilic membrane, wherein said first membrane sheet and said second membrane sheet form a channel which loosely contains said first screen and said second screen.

3. The membrane humidifying device of claims 1 or 2 wherein said hydrophilic membrane is an ion exchange membrane selected from the group consisting of perfluorocarbon sulfonic acid membranes and polystyrene sulfonic acid membranes.

4. The membrane humidifying device of claim 3 wherein said hydrophilic membrane is perfluoro-sulfonic acid membrane.

5. The membrane humidifying device of claims 1 or 2 wherein said screens are metal screens wherein said metal is selected from the group consisting of silver, aluminum, stainless steel and mixtures thereof.

6. A system for producing humidified air which comprises:
   a. a membrane humidifying device that comprises at least one membrane cell and a means for introducing water into said cell wherein said membrane cell comprises:
      i. at least one sheet of a hydrophilic membrane having a first side and a second side: capable of osmotically transporting water from said first side to said second side: and
      ii. at least one screen for providing structural integrity to said hydrophilic membrane(s), wherein each screen is located adjacent to said first side of at least one membrane and wherein said screen(s) has a mesh size of about 2/0 to about 6/0 and a thickness of about 0.05 to about 0.5 millimeters;
      wherein said means for introducing water into said cell directs water to said first side(s) of said hydrophilic membrane (s);
   b. a liquid reservoir for the temporary storage of water in fluid connection with said membrane humidifying device;
   c. a means for the introduction of water into said liquid reservoir; and
   d. a means for regulating the pressure of water flowing from said membrane humidifying device to said liquid reservoir.

7. The system for producing humidified air of claims 6 wherein said screens are metal screens wherein said metal is selected from the group consisting of silver, aluminum, stainless steel and mixtures thereof.

8. The system for producing humidified air of claim 6 wherein said membrane cell comprises the following four contiguous layers:
   a. a first sheet of a hydrophilic membrane;
   b. a first screen;
   c. a second screen; and
   d. a second sheet of a hydrophilic membrane,
   wherein said first membrane sheet and said second membrane sheet form a channel which loosely contains said first screen and said second screen.

9. The system for producing humidified air of claim 6 wherein said liquid reservoir comprises:
   a. a means to constantly monitor the water level in said liquid reservoir wherein said means is in electronic contact with a fill valve that is in fluid contact with said liquid reservoir; and
   b. a means to constantly monitor the conductivity level of water in said liquid reservoir wherein said means is in electronic contact with a purge valve that is in fluid contact with said liquid reservoir.

10. The system for producing humidified air of claim 6 wherein said means for regulating the pressure of water flowing from said membrane humidifying device to said liquid reservoir is a positive displacement pump.

11. The system for producing humidified air of claims 6 or 8 wherein said hydrophilic membrane is an ion exchange membrane selected from the group consisting of perfluorocarbon sulfonic acid membranes and polystyrene sulfonic acid membranes.

12. The system for producing humidified air of claim 11 wherein said hydrophilic membrane is perfluoro-sulfonic acid membrane.

13. A method for producing humidified air using a membrane humidifying device which comprises at least one membrane cell and a means for introducing water into said cell and which is positioned in the flow path of air to be humidified, said method comprising:
   a. introducing ambient or low pressure water into said membrane cell(s) which comprises at least one sheet of a hydrophilic membrane, having a first side and a second side, and at least one screen for providing structural integrity to said membrane(s) wherein said screen(s) has a mesh size of about 2/0 to about 6/0 and a thickness of about 0.05 to about 0.5 millimeters;
   b. contacting said water with said screen(s);
   c. contacting said water with said first side(s) of said hydrophilic membrane(s);
   d. osmotically transporting said water across said membrane(s) to said second side(s) of said membrane(s); and
   e. evaporating said transported water into said flow path of air.

14. A method for producing humidified air using a system for producing humidified air which comprises a membrane humidifying device having at least one membrane cell and a means for introducing water into said cell; a liquid reservoir in fluid connection with said membrane humidifying device; a means for the introduction of water into said liquid reservoir; and a means for regulating the pressure of water flowing from said membrane humidifying device to said liquid reservoir; and which is positioned in the flow path of air to be humidified, said method comprising:
   a. introducing water into said liquid reservoir;
   b. introducing ambient or low pressure water from said liquid reservoir to said membrane cell(s) which comprises at least one sheet of a hydrophilic membrane, having a first side and a second side, and at least one screen for providing structural integrity to said membrane ( s ) wherein said screen(s) has a mesh size of about 2/0 to about 6/0 and a thickness of about 0.05 to about 0.5 millimeters;
   c. contacting said water with said screens;
   d. contacting said water with said first side(s) of said hydrophilic membrane(s);
   e. osmotically transporting said water across said membrane(s) to said second side(s) of said membrane(s); evaporating said transported water into said flow path of air; and
   g. flowing water not transported across said membrane(s) to said pressure regulating means and then to said liquid reservoir.

15. The method for producing humidified air of claim 14 wherein water not transported across said membrane(s) is recycled through said system.

* * * * *

UNITED STATES PATENT AND TRADEMARK OFFICE
CERTIFICATE OF CORRECTION

PATENT NO. : 5,348,691

DATED : September 20, 1994

INVENTOR(S) : McElroy et al.

It is certified that error appears in the above-identified patent and that said Letters Patent is hereby corrected as shown below:

In Column 6, Line 43 delete "claims" and insert --claim--.

In Column 8, line 25 before "evaporating" insert --f.--.

Signed and Sealed this

Sixth Day of December, 1994

Attest:

BRUCE LEHMAN

*Attesting Officer*    *Commissioner of Patents and Trademarks*